US012665776B2

(12) United States Patent
Mu et al.

(10) Patent No.: US 12,665,776 B2
(45) Date of Patent: Jun. 23, 2026

(54) METHOD AND APPARATUS FOR CLASSIFYING BLOCKCHAIN ADDRESS

(71) Applicant: Digital Currency Institute, The People's Bank of China, Beijing (CN)

(72) Inventors: Changchun Mu, Beijing (CN); Gang Di, Beijing (CN); Sude Qing, Beijing (CN); Yanhui Wang, Beijing (CN); Junwei Zeng, Beijing (CN); Hao Wu, Beijing (CN)

(73) Assignee: DIGITAL CURRENCY INSTITUTE, THE PEOPLE'S BANK OF CHINA, Beijing (CN)

( * ) Notice: Subject to any disclaimer, the term of this patent is extended or adjusted under 35 U.S.C. 154(b) by 201 days.

(21) Appl. No.: 18/276,865

(22) PCT Filed: Feb. 10, 2022

(86) PCT No.: PCT/CN2022/075941
§ 371 (c)(1),
(2) Date: Aug. 10, 2023

(87) PCT Pub. No.: WO2022/171186
PCT Pub. Date: Aug. 18, 2022

(65) Prior Publication Data
US 2024/0121119 A1 Apr. 11, 2024

(30) Foreign Application Priority Data
Feb. 10, 2021 (CN) .......................... 202110185440.9

(51) Int. Cl.
*H04L 9/00* (2022.01)
*G06F 16/35* (2019.01)
*G06F 18/20* (2023.01)

(52) U.S. Cl.
CPC ................ *H04L 9/50* (2022.05); *G06F 16/35* (2019.01); *G06F 18/20* (2023.01); *G06Q 2220/00* (2013.01); *H04L 2209/56* (2013.01)

(58) Field of Classification Search
None
See application file for complete search history.

(56) References Cited

U.S. PATENT DOCUMENTS

2016/0335628 A1* 11/2016 Weigold ............... G06Q 20/065
2020/0013026 A1* 1/2020 Noonan ........... G06Q 20/38215
(Continued)

FOREIGN PATENT DOCUMENTS

CN 103152350 B * 8/2017
CN 109918584 A * 6/2019
(Continued)

OTHER PUBLICATIONS

The search report of counterpart EP application No. 22752346.1 issued on Dec. 11, 2024.
(Continued)

*Primary Examiner* — Lashonda Jacobs-Burton
(74) *Attorney, Agent, or Firm* — The Sun IP Law

(57) ABSTRACT

The present disclosure relates to the technical field of computers, in particular to a method and apparatus for classifying a blockchain address. The method includes: transaction vectors are generated for transaction records corresponding to each blockchain address in a blockchain address set; a corresponding address vector is generated based on the transaction vectors corresponding to a blockchain address to be classified; and the address vector of the blockchain address to be classified is input into a classifier, so as to determine a class of the blockchain address to be classified. By means of the method, equal-length vectors representing the blockchain addresses can be obtained for
(Continued)

All transaction records in which each blockchain address participates are extracted The transaction records are numbered and sequenced A transaction vector corresponding to each transaction is calculated An address vector corresponding to each blockchain address is calculated The address vectors of blockchain addresses with known classes are input into the classification algorithm model for training, so as to obtain a trained classifier The address vector of the blockchain address to be classified is input into the trained classifier to obtain a class of the blockchain address to be classified classification by the classifier, transaction behaviors and association relationships of participating entities in a blockchain are effectively expressed.

17 Claims, 5 Drawing Sheets

(56)                   References Cited

U.S. PATENT DOCUMENTS

| | | | |
|---|---|---|---|
| 2020/0374300 A1 | 11/2020 | Manevich et al. | |
| 2021/0105142 A1* | 4/2021 | Lee | G06F 21/31 |
| 2022/0019986 A1* | 1/2022 | Chen | G06Q 20/405 |
| 2022/0318898 A1* | 10/2022 | Pei | G06F 17/16 |

FOREIGN PATENT DOCUMENTS

| | | | | |
|---|---|---|---|---|
| CN | 109993529 A | | 7/2019 | |
| CN | 110457404 A | | 11/2019 | |
| CN | 111104571 A | | 5/2020 | |
| CN | 111754345 A | | 10/2020 | |
| CN | 111914243 A | | 11/2020 | |
| CN | 113052577 A | * 6/2021 | | G06F 18/241 |
| CN | 113177232 A | * 7/2021 | | G06F 21/6227 |

OTHER PUBLICATIONS

The first office action of counterpart CN application No. 2021101854409 issued on Oct. 17, 2024.

* cited by examiner

Fig. 1

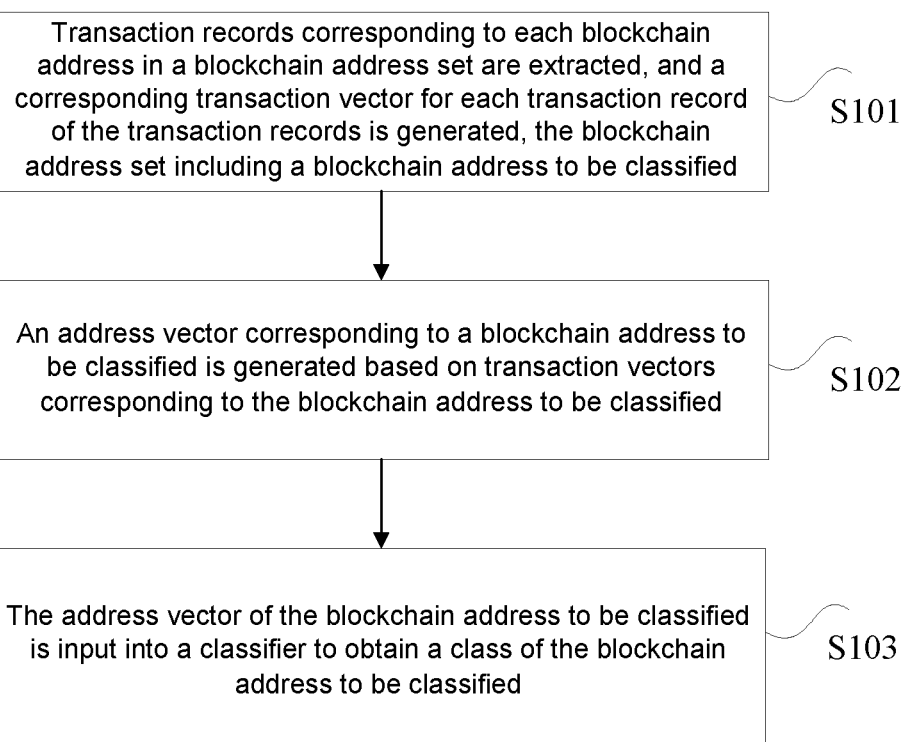

Transaction records corresponding to each blockchain address in a blockchain address set are extracted, and a corresponding transaction vector for each transaction record of the transaction records is generated, the blockchain address set including a blockchain address to be classified — S101

An address vector corresponding to a blockchain address to be classified is generated based on transaction vectors corresponding to the blockchain address to be classified — S102

The address vector of the blockchain address to be classified is input into a classifier to obtain a class of the blockchain address to be classified — S103

METHOD AND APPARATUS FOR CLASSIFYING BLOCKCHAIN ADDRESS

TECHNICAL FIELD

The present disclosure relates to the technical field of computers, in particular to a method and apparatus for classifying a blockchain address.

BACKGROUND

Blockchain address is a hash that has been encrypted many times. Very few statistical features may be extracted directly from the blockchain address, so it is difficult to directly use the traditional statistical method or the tradi-tional machine learning method to determine whether the blockchain address is used in a normal transaction or an illegal transaction.

Due to the characteristics of blockchain address classifi-cation, it is difficult to directly use the traditional statistical method or the traditional machine learning method for classification, and existing methods have poor classification accuracy and unreliable results, and also have error propa-gation, and high requirements for hardware resources and time costs.

SUMMARY

According to one aspect of an embodiment of the present disclosure, a method for classifying a blockchain address is provided.

The method for classifying the blockchain address includes: extracting transaction records corresponding to each blockchain address in a blockchain address set, and generating a corresponding transaction vector for each trans-action record of the transaction records, the blockchain address set including a blockchain address to be classified; generating, based on transaction vectors corresponding to the blockchain address to be classified, an address vector corresponding to the blockchain address to be classified; and inputting the address vector of the blockchain address to be classified into a classifier to obtain a class of the blockchain address to be classified.

According to another aspect of an embodiment of the present disclosure, an electronic device is provided.

The electronic device includes: one or more processors; and a memory, configured to store one or more programs. The one or more programs, when executed by the one or more processors, cause the one or more processors to implement following actions: extracting transaction records corresponding to each blockchain address in a blockchain address set, and generating a corresponding transaction vector for each transaction record of the transaction records, the blockchain address set comprising a blockchain address to be classified; generating, based on transaction vectors corresponding to the blockchain address to be classified, an address vector corresponding to the blockchain address to be classified; and inputting the address vector of the blockchain address to be classified into a classifier to obtain a class of the blockchain address to be classified.

According to still another aspect of an embodiment of the present disclosure, a non-transitory computer-readable medium is provided.

The non-transitory computer-readable medium has a com-puter program stored thereon, and the program, when executed by a processor, implements following actions: extracting transaction records corresponding to each block-chain address in a blockchain address set, and generating a corresponding transaction vector for each transaction record of the transaction records, the blockchain address set com-prising a blockchain address to be classified; generating, based on transaction vectors corresponding to the block-chain address to be classified, an address vector correspond-ing to the blockchain address to be classified; and inputting the address vector of the blockchain address to be classified into a classifier to obtain a class of the blockchain address to be classified.

BRIEF DESCRIPTION OF THE DRAWINGS

The accompanying drawings are included to provide a better understanding of the present disclosure and are not to be construed as unduly limiting the present disclosure.

FIG. 1 is a schematic diagram of main steps of a method for classifying a blockchain address according to some embodiments of the present disclosure;

DETAILED DESCRIPTION OF THE EMBODIMENTS

Figure 2:
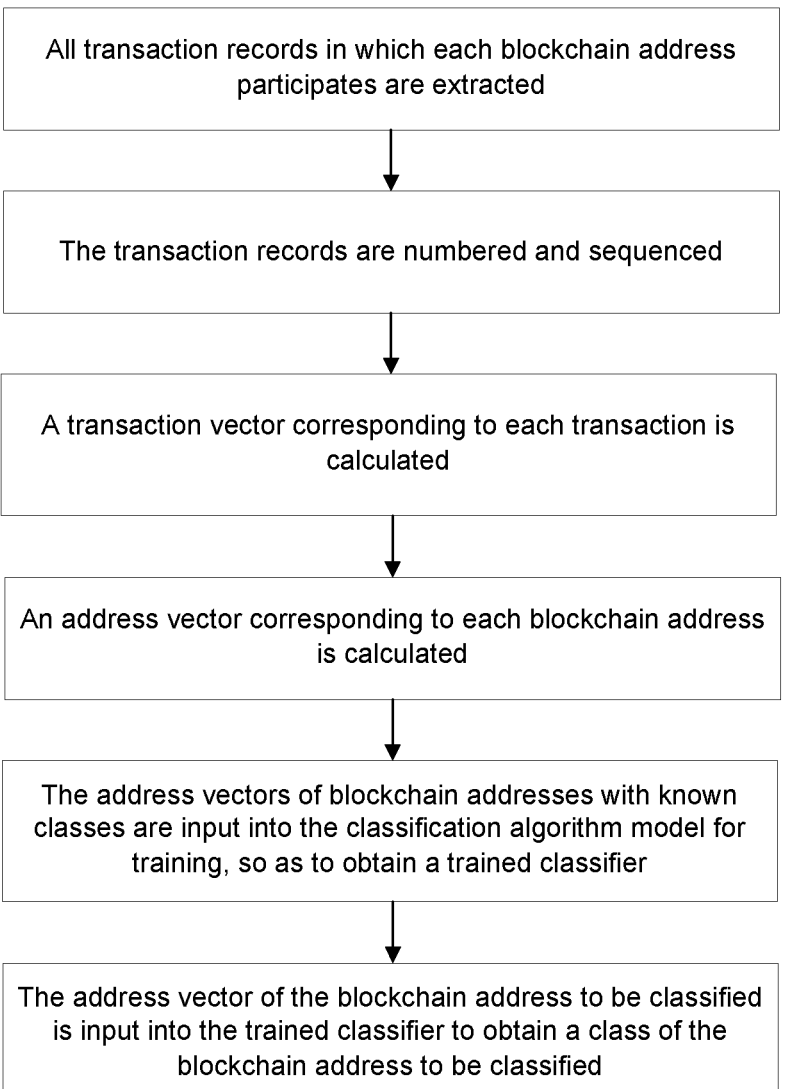
FIG. 2 is a schematic diagram of a classification process of blockchain addresses according to some embodiments of the present disclosure.

Exemplary embodiments of the present disclosure will be described below with reference to the accompanying draw-ings, where the various details of the embodiments of the present disclosure are set forth to aid in understanding, which are to be considered exemplary only. Accordingly, a person of ordinary skill in the art will recognize that various changes and modifications may be made to the embodiments described herein without departing from the scope and spirit of the present disclosure. Similarly, for clarity and concise-ness, the description of well-known functions and structures is omitted from the following description.

The terminology used herein is for the purpose of describ-ing particular embodiments only and is not intended to limit the disclosure. As used herein, the singular forms "a", "an" and "the" are intended to include the plural forms as well, unless the context clearly indicates otherwise. It will further be understood that the terms "comprises" and/or "compris-ing," when used in this specification, specify the presence of stated features, integers, steps, operations, elements, and/or components, but do not preclude the presence or addition of one or more other features, integers, steps, operations, elements, components, and/or groups thereof.

FIG. 1 is a schematic diagram of main steps of a method for classifying a blockchain address according to an embodi-ment of the present disclosure.

As shown in FIG. 1, the method for classifying the blockchain address according to the embodiment of the present disclosure mainly includes the following steps S101 to S103.

Step S101: Transaction records corresponding to each blockchain address in a blockchain address set are extracted, and a corresponding transaction vector for each transaction record is generated. The blockchain address set includes a blockchain address to be classified.

Step S102: An address vector corresponding to the blockchain address to be classified is generated based on transaction vectors corresponding to the blockchain address to be classified.

Step S103: The address vector of the blockchain address to be classified is input into a classifier to obtain a class of the blockchain address to be classified.

In some embodiments, the blockchain address set may be a set formed by classified and tagged blockchain addresses extracted from a blockchain and blockchain addresses that need to be classified and tagged. The classified and tagged blockchain addresses are blockchain addresses with tags, the tags indicating corresponding classes of the blockchain addresses. The blockchain addresses that need to be classified and tagged are the blockchain addresses to be classified.

A blockchain address is a transaction address for a transaction on the blockchain, such as a wallet address.

One transaction record corresponding to a blockchain address is one transaction in which the blockchain address participates, and each blockchain address may correspond to one or more transaction records. Each transaction may have one or more blockchain addresses participating in, i.e., one or more blockchain addresses may correspond to the same transaction record.

In some embodiments, the step of extracting the transaction records corresponding to each blockchain address in the blockchain address set, and generating the corresponding transaction vector for each transaction record includes: the transaction records corresponding to each blockchain address in the blockchain address set are extracted, and the extracted transaction records are numbered sequentially based on transaction generation time, each transaction record having a unique transaction number; a set is taken as one corpus, wherein the set is a set of the transaction records corresponding to each blockchain address in the blockchain addresses set; transaction numbers are sequenced based on frequency of occurrence of the transaction numbers in all corpora to obtain a transaction number word list; and the transaction numbers in the transaction number word list are vectorized to obtain the transaction vector of a corresponding transaction record.

The step of vectorizing the transaction numbers in the transaction number word list to obtain the transaction vector of the corresponding transaction record may include: the transaction numbers in the transaction number word list are encoded to obtain a sparse matrix including transaction number encoded vectors, a component of 1 in the transaction number encoded vectors indicating a position of a corresponding transaction number in the transaction number word list; and the transaction vector of the corresponding transaction record is generated based on the sparse matrix by means of a preset word vector generation algorithm.

In some embodiments, the step of generating, by means of the preset word vector generation algorithm, the transaction vector of the corresponding transaction record based on the sparse matrix includes: the sparse matrix is input into a Continuous Bag of Words (CBOW) model of the preset word vector generation algorithm (for example, a word2vec algorithm) for training, and a word vector is output as the transaction vector of the corresponding transaction record.

In some embodiments, the step of generating, based on the transaction vectors corresponding to the blockchain address to be classified, the address vector corresponding to the blockchain address to be classified includes: an average value of all transaction vectors corresponding to the blockchain address to be classified is calculated to obtain the address vector corresponding to the blockchain address to be classified. By means of the method, the address vector of each blockchain address to be classified may be obtained.

In some embodiments, address vectors corresponding to the blockchain addresses with the tags are generated based on the transaction vectors corresponding to the blockchain addresses with the tags; and the classifier is trained with the address vectors of the blockchain addresses with the tags. The classifier may be implemented through various classifiers or classification models with a supervised learning function.

In some embodiments, the step of training the classifier with the address vectors of the blockchain addresses with the tags includes: a training set is constructed with the address vectors of the blockchain addresses with the tags, and the address vectors in the training set are input into an eXtreme Gradient Boosting (XGBoost) algorithm model for training, so as to obtain the classifier.

Blockchain technology, with unique characteristics of "honesty" and "transparency", may better protect the rights and interests of users, and how to classify addresses of blockchain data is an urgent problem to be solved. The blockchain data according to the embodiment of the present disclosure may be blockchain addresses of a public chain, a private chain, or a consortium blockchain. The public chain is illustrated as an example according to the embodiment of the present disclosure.

Traditional machine learning has a large number of classification methods, such as a classical logistic regression, a support vector machine, a classification tree and a random forest which are based on a tree algorithm, and a gradient boosting algorithm based on gradients. Although it is verified that the above methods have good performance in many application scenarios, the methods have two fatal problems as for blockchain address classification: firstly, the transaction behavior of consumers may be affected by various external environments, resulting in changes in the model relationship between output variables and input variables over time; but the traditional machine learning methods mentioned above may only deal with cross-sectional data, and may not deal with time-dependent panel data. Secondly, even if a panel data model is built by means of traditional statistical methods, a satisfactory model is not able to be obtained by training through traditional statistical modeling because there are too few extractable statistical features in transaction information of public blockchains (or private chains, or consortium blockchains).

To overcome the above defects in the related art, some embodiments of the present disclosure provides a method for classifying a blockchain address based on a word vector, which may effectively express transaction behaviors and association relationships of each participating entity in the blockchain, while avoiding the problem that feature engineering in traditional machine learning is prone to being affected by the external environment such as participants, transaction modes, and an exchange rate between blockchain tokens to legal tender. The transaction records corresponding to each blockchain address in a dataset (including tagged data and untagged data) are acquired and sequenced by processing the transaction data of the blockchain address. The corresponding address vector of the same dimension are generated for all blockchain addresses by a way of generating the word vector, the address vectors having tags are trained based on the XGBoost algorithm to generate a classification model (the classifier), and then the blockchain addresses to be classified are classified.

The classification process of the blockchain addresses according to an embodiment of the present disclosure is shown in FIG. 2, and mainly includes: all transaction records in which each blockchain address participates are extracted; the transaction records are numbered and sequenced; the transaction vector corresponding to each transaction is calculated; the address vector corresponding to each blockchain address is calculate; the address vectors of blockchain addresses with known classes are input into a classification algorithm model for training, so as to obtain the trained classifier; and the address vector of the blockchain address to be classified is input into the trained classifier to obtain the classes of the blockchain address to be classified.

The classification process for the blockchain address (referred to as address in this embodiment) according to this embodiment is described in detail below.

Firstly, data preparation is required. This step is mainly to extract, from the blockchain, all transactions in which relevant addresses (including classified and tagged addresses and addresses that need to be classified and tagged, all these addresses constituting a blockchain address set) participate, and to construct a corresponding relationship between the addresses and a transaction sequence. The classified and tagged addresses are the blockchain addresses with tags, and the addresses that need to be classified and tagged are the blockchain addresses to be classified.

Data preparation includes the following steps: all transactions (each transaction having a corresponding transaction record) in which the address participate are extract from historical transaction records of the blockchain; all transaction records are numbered from smallest to largest in chronological order of the transactions (i.e. the transaction generation time), where the larger the transaction number, the later the transaction is generated. For example, assuming that all extracted blockchain addresses correspond to a total of 10,000 transactions, the transaction numbers are 1 to 10,000; in addition, the transaction number list corresponding to each address is collated, the transaction numbers in the transaction number list are sequenced from smallest to largest. According to the above steps, each transaction record has a corresponding transaction number, and each blockchain address has its own transaction number list which includes the transaction records and the corresponding transaction numbers. For example, the transaction numbers in the transaction number list of an address a include: 1, 2, 4, 6, . . . ; and the transaction numbers in the transaction number list of an address b include: 3, 4, 5, . . . . Based on this example, it may be seen that according to the embodiment of the present disclosure, different addresses may participate in the same transaction, namely, different addresses may correspond to the same transaction number. For example, the address a and the address b both participate in the transaction with the transaction number of 4. Each address may correspond to one or more transaction numbers, for example, the address a corresponds to the transaction numbers 1, 2, 4, 6, . . . . Thus, the corresponding relationship between the blockchain addresses and the transaction sequence is constructed, that is, all blockchain addresses as a whole correspond to one transaction sequence which includes all transaction records and the transaction numbers corresponding to the transaction records. Each blockchain address in turn has its own transaction sequence which merely includes the transaction records corresponding to the blockchain address and the transaction numbers corresponding to the transaction records.

After the step of data preparation, a vector representing the transaction number, i.e., the transaction vector, is generated. The transaction numbers in the above prepared data may be used as training data, and then unsupervised learning is performed using the word2vec algorithm (a word vector generation algorithm). A word vector corresponding to each transaction number is obtained by training, and the word vector is the transaction vector. Since the transaction records and the transaction numbers are in one-to-one correspondence, the word vectors corresponding to the transaction numbers are the transaction vectors of the corresponding transaction records.

The transaction vector is generated by the following steps: a corpus for training the word vector is made; a transaction number word list is made; a sparse matrix is obtained through one-hot codes; training is performed by using the CBOW model of the word2vec algorithm to obtain the word vector corresponding to each transaction number.

Making the corpus for training the word vector may include: the transaction list (i.e., the transaction sequence) corresponding to each address is taken as one corpus, that is, a sequence including transaction number information and having the transaction records arranged by the transaction numbers from smallest to largest is formed for each address. The transaction sequence corresponding to one address is a set of transaction records corresponding to the address.

Making the transaction number word list may include: the transaction numbers are sequenced based on the frequency of occurrence of the transaction numbers in the transaction sequences corresponding to the addresses (i.e., all corpora). For example, the transaction numbers are sequenced in a descending order of frequency of occurrence, and use a serial number to represent one transaction, such that the transaction number word list is obtained. For example, assuming that there are 6 transactions in total, the transaction numbers in the transaction sequence of an address c are 1, 2, 4, 6, and the transaction numbers in the transaction sequence of another address d are 1, 3, 4, 5, the address c and address d are two corpora correspondingly. The transaction numbers with the largest frequency of occurrence in all corpora are "1" and "4", which occur in both corpora with a frequency of 2 times, the frequency of occurrence of other transaction numbers is 1 time, and thus the transaction numbers in the transaction number word list may be 1, 4, 2, 3, 5, 6 according to the above sequencing rules. Different transaction numbers with the same frequency of occurrence may be sorted from smallest to largest. It is to be noted that the above example is merely for the convenience of illustrating how the transaction number word list is generated, and the actual number of transactions is much larger than the 6 transactions in this example.

Obtaining the sparse matrix through the one-hot codes may include: the transaction numbers in the transaction number word list are encoded through the one-hot codes according to the embodiment of the present disclosure. Each transaction number in the transaction number word list is represented by a vector (i.e., a transaction number encoded vector) with dimensions being the total number of transactions (i.e., the number of transaction records), so as to obtain the sparse matrix formed by the transaction number encoded vectors. Each transaction number encoded vector merely includes one component of 1, and all other components are 0. The position of the component of 1 in the vector corresponds to the position of the transaction in the transaction number word list. For example, if the serial number of a transaction number in the transaction number word list is 2, the corresponding transaction number encoded vector is (0 1 0 0 0 . . . ). The number of dimensions of the transaction number encoded vector is the number of transaction records. For example, assuming that the total number of transactions is 10,000, the number of transaction records=10,000, and thus the number of dimensions of the transaction number encoded vector is 10,000.

The sparse matrix obtained above is input into the CBOW model of the word2vec algorithm for training to obtain the word vectors corresponding to the transaction numbers, namely the transaction vector of a corresponding transaction record. The alternative steps for training the CBOW model to output the word vector will be further described hereinafter.

Through the above process, according to the embodiment of the present disclosure, unequal-length sequences are formed by the transactions in which the blockchain addresses participate, and the unequal-length sequences are taken as features to represent the addresses. For example, if an address e participates in 10 transactions and an address f participates in 50 transactions, the length of the transaction sequence of the address e is 10, the length of the transaction sequence of the address f is 50, and the sequences may be used as features to represent the blockchain addresses.

After the step of generating the transaction vectors, a vector representing the transaction address, i.e., the address vector of the blockchain address, is generated. For example, the address vector of a blockchain address may be obtained by averaging all transaction vectors of the transaction sequence in which the address participates, namely, by averaging all transaction vectors corresponding to the blockchain address.

According to the embodiment of the present disclosure, the word vector technique is used to process the above unequal-length sequences formed by the transactions in which the addresses participate, and vectors with the same dimension may be generated. That is, the address vectors of different blockchain addresses have the same number of dimensions, such that equal-length vectors that may be used for classifying the blockchain address by the classifier are obtained. The problem that traditional machine learning methods may merely deal with cross-sectional data and can not deal with the time-dependent panel data, and the problem that a satisfactory model can not be obtained by training with traditional statistical modeling because there are too few extractable statistical features in transaction information of public blockchains are solved.

The address vectors of the blockchain addresses are obtained by the above steps. Among the address vectors, the blockchain addresses with tags may be used to train the classifier, and the address vectors of the blockchain addresses to be classified are input to the trained classifier to obtain the classes of the blockchain addresses to be classified, for example, the class may be an address for abnormal transactions or the address for the normal transactions.

The process of training the classifier and the process of classification using the classifier are described below.

A pre-processing step before training may include: the classified and tagged address data (i.e., the blockchain addresses with tags) are randomly divided into training data and test data in proportion.

Taking the vector-based classification model (i.e., the classifier) being trained by the extreme Gradient Boosting (XGBoost) algorithm as an example, the input of the algorithm is a training set sample $J=\{(x_1, y_1), (x_2, y_2), \ldots$ $(x_m > y_m)\}$. In the training set sample J, $x_i$ denotes the address vector of the blockchain address, $y_i$ denotes the tag which indicates the class of the blockchain address, and $i \in [1,m]$. The maximum number of iterations is T, the loss function is L, the regularization factor is $\lambda$, $\gamma$, and the output is a strong learner f(x). The main flow of the algorithm is as follows: for the number of iteration rounds $t=1, 2, \ldots, T$, a first-order derivative $g_{ti}$ and a second-order derivative $h_{ti}$ of an i-th ($i=1, 2, \ldots, m$) sample are calculated in the loss function L of the current around based on $f_{t-1}(x_i)$, and the sum of first-order derivatives $$G_t = \sum_{i=1}^{m} g_{ti}$$

of all samples and the sum of second-order derivatives $$H_t = \sum_{i=1}^{m} h_{ti}$$

of all samples are calculated.

A decision tree is tried to be split based on a current node, with the default score=0. G and H are respectively the sum of the first-order derivatives and the sum of the second-order derivatives of the current node to be split. For feature serial numbers $k=1, 2, \ldots, K$:

$$G_L = 0, H_L = 0$$

Samples are sequenced by the features k from smallest to largest, the i-th sample is taken out in sequence, and the sum of the first-order derivatives and the sum of the second-order derivatives of a left subtree, as well as the sum of the first-order derivatives and the sum of the second-order derivatives of a right subtree are sequentially calculated after a current sample is placed to the left subtree.

$$G_L = G_L + g_{ti}, G_R = G - G_L$$
$$H_L = H_L + h_{ti}, H_R = H - H_L.$$

The maximum score is tried to be updated:

$$\text{score} = \max\left(\text{score}, \frac{1}{2}\frac{G_L^2}{H_L + \lambda} + \frac{1}{2}\frac{G_R^2}{H_R + \lambda} - \frac{1}{2}\frac{(G_L + G_R)^2}{H_L + H_R + \lambda} - \gamma\right)$$

The subtree is split based on division features and eigenvalues corresponding to the maximum score.

If the maximum score is 0, the current decision tree is completed built, $w_{tj}$ in all leaf regions are calculated so as to obtain a weak learner $h_t(x)$, the strong learner $f_i(x)$ is updated, and the next iteration round of the weak learner is proceeded. If the maximum score is not 0, the above step of trying to split the decision tree based on the current node is gone on to continue to try to split the decision tree.

The address vector of the blockchain address to be classified is input into the trained classification model (i.e., the classifier) to determine the class of the address, and a classification result is obtained, that is, the class of the blockchain address to be classified is obtained.

According to the embodiment of the present disclosure, the classification model is trained based on the address vectors to complete the classification task for the blockchain address. The classifier may not be limited to the classifier implemented by the above-mentioned XGBoost algorithm, and may also be implemented using other classification models, classification networks or classification algorithms based on machine learning.

Figure 3:
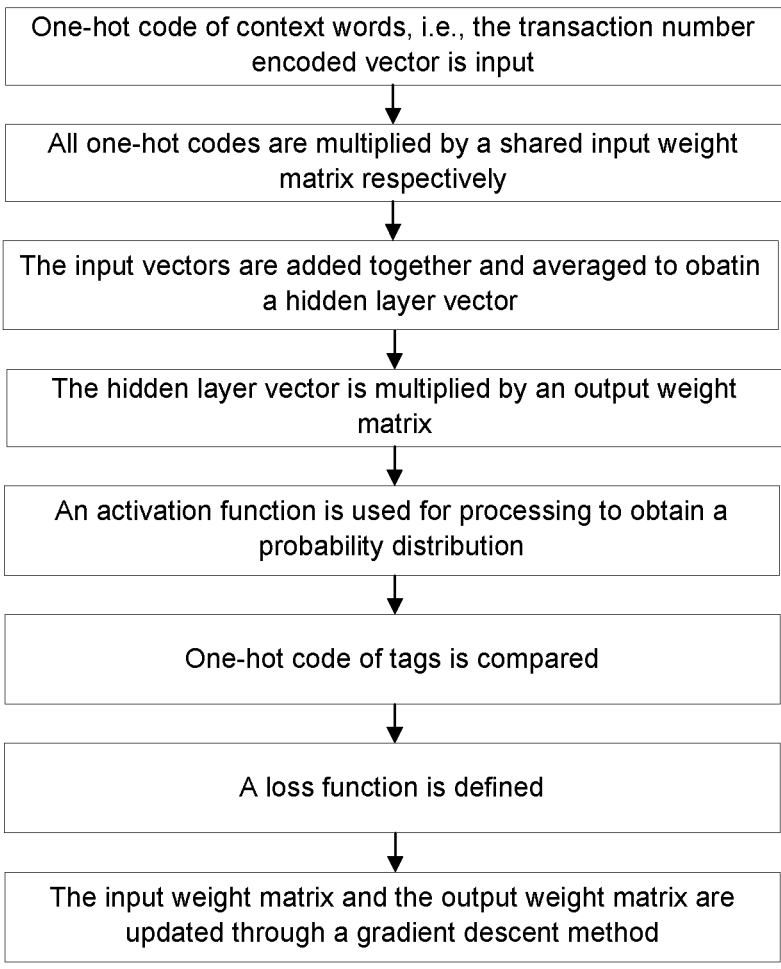
FIG. 3 is a schematic flow diagram of training a CBOW model to output word vectors according to some embodi-ments of the present disclosure.

FIG. 3 is a schematic flow diagram of training the CBOW model to output the word vector according to an embodiment of the present disclosure. The process of training the CBOW model to output word vector according to some embodiments of the present disclosure includes: one-hot code of a context word, i.e., the transaction number encoded vector is input; all one-hot codes are multiplied by a shared input weight matrix respectively; the input vectors are add together and averaged as a hidden layer vector; the hidden layer vector is multiplied by an output weight matrix; an activation function is used for processing to obtain probability distribution, the activation function being used for converting values in the output vectors into probabilities; one-hot codes of the tags are compared; a loss function is defined; and the input weight matrix W and the output weight matrix W' are updated through a gradient descent method.

The process of training the CBOW model to output the word vectors according to an embodiment of the present disclosure is described in detail below.

The input of training of the CBOW model is a word vector corresponding to contextually relevant words of a particular feature word, and the output is a word vector of the particular word. The word vector of a word is the word vector corresponding to the transaction number according to the embodiment of the present disclosure, that is, the transaction vector. The process includes the following sub-steps:

The output of a hidden layer h is calculated as follows:

$$h = \frac{1}{C} W \cdot \left( \sum_{i=1}^{C} x_i \right)$$

where $x_i$ is the input context word, Wis the input weight matrix, Cis the window size, and the output is the weighted average of the input vectors.

The input at each node of an output layer is calculated as follows:

$$u_j = v_{w_j}^{'T} \cdot h$$

where $$v_{w_j}^{'T}$$

is a j-th column of the output weight matrix W'.

The output $y_j$ of the output layer is calculated as follows:

$$y_{c,j} = p(w_{y,j} | w_1, \ldots, w_c) = \frac{\exp(u_j)}{\sum_{j=1}^{v} \exp(u_j)}$$

The loss function is defined, wherein the loss function refers to the conditional probability of the output word for a given input context, typically logarithmically, as follows:

$$E = -\log p(w_o | w_i) = -v_{wo}^T \cdot h - \log \sum_{j=1}^{v} \exp\left(v_{wj}^T \cdot h\right)$$

The update rule for the output weight matrix W' is as follows:

$$w'^{(new)}_{ij} = w'^{(old)}_{ij} - \eta \cdot (y_j - t_j) \cdot h_i$$

The update rule of the input weight matrix Wis as follows:

$$w^{(new)}_{ij} = w^{(old)}_{ij} - \eta \cdot \frac{1}{C} \cdot EH$$

Upon completion of the training, a vector obtained by multiplying each word of the input layer with the input weight matrix W is the desired word vector. According to the embodiment of the present disclosure, the word is the transaction number.

Figure 4:
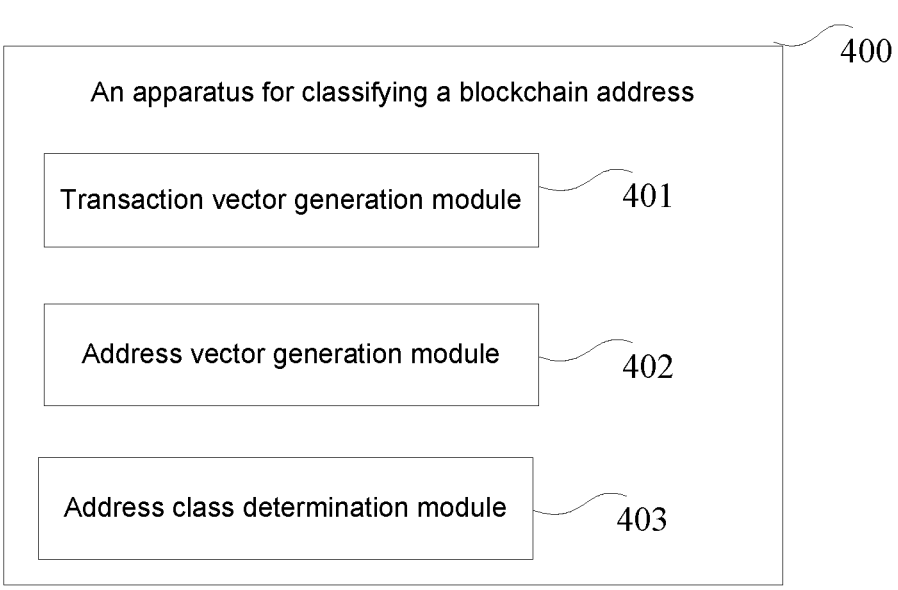
FIG. 4 is a schematic diagram of main modules of an apparatus for classifying the blockchain address according to some embodiments of the present disclosure.

FIG. 4 is a schematic diagram of main modules of an apparatus for classifying the blockchain address according to an embodiment of the present disclosure.

As shown in FIG. 4, the apparatus for classifying the blockchain address 400 according to the embodiment of the present disclosure mainly includes: a transaction vector generation module 401, an address vector generation module 402, and an address class determination module 403.

The transaction vector generation module 401 is configured to extract transaction records corresponding to each blockchain address in a blockchain address set, and generate a corresponding transaction vector for each transaction record, the blockchain address set including a blockchain address to be classified.

The address vector generation module 402 is configured to generate, based on transaction vectors corresponding to the blockchain address to be classified, an address vector corresponding to the blockchain address to be classified.

The address class determination module 403 is configured to input the address vector of the blockchain address to be classified into a classifier to obtain a class of the blockchain address to be classified.

The transaction vector generation module 401 may be configured to: extract the transaction records corresponding to each blockchain address in the blockchain address set, and number the extracted transaction records sequentially based on transaction generation time, each transaction record having a unique transaction number; take a set as one corpus, wherein the set is a set of the transaction records corresponding to each blockchain address in the blockchain addresses set; sequence the transaction numbers based on frequency of occurrence of the transaction numbers in all corpora to obtain a transaction number word list; and vectorize the transaction numbers in the transaction number word list to obtain the transaction vector of a corresponding transaction record.

The transaction vector generation module 401 may include a transaction number vectorizing sub-module, configured to: encode the transaction numbers in the transaction number word list to obtain a sparse matrix including transaction number encoded vectors, a component of 1 in the transaction number encoded vectors indicating a position of a corresponding transaction number in the transaction number word list; and generate, by means of a preset word vector generation algorithm, the transaction vector of the corresponding transaction record based on the sparse matrix.

The blockchain address set may further include blockchain addresses with tags, the tags indicating corresponding classes of the blockchain addresses.

The transaction number vectorizing sub-module may be configured to: input the sparse matrix into a Continuous Bag of Words (CBOW) model of the preset word vector generation algorithm for training, and output a word vector as the transaction vector of the corresponding transaction record.

The address vector generation module 402 may be configured to: calculate an average value of all transaction vectors corresponding to the blockchain address to be classified to obtain the address vector corresponding to the blockchain address to be classified.

The apparatus for classifying the blockchain address 400 may further include a first training module, configured to: generate, based on transaction vectors corresponding to the blockchain addresses with the tags, address vectors corresponding to the blockchain addresses with the tags; and train the classifier with the address vectors of the blockchain addresses with the tags.

The first training module may be configured to: construct a training set with the address vectors of the blockchain addresses with the tags, and input the address vectors in the training set into an eXtreme Gradient Boosting algorithm model for training, so as to obtain the classifier.

In addition, the specific contents of the apparatus for classifying the blockchain address according to the embodiment of the present disclosure have been described in detail in the above blockchain address classification method, which are thus not repeated herein.

Figure 5:
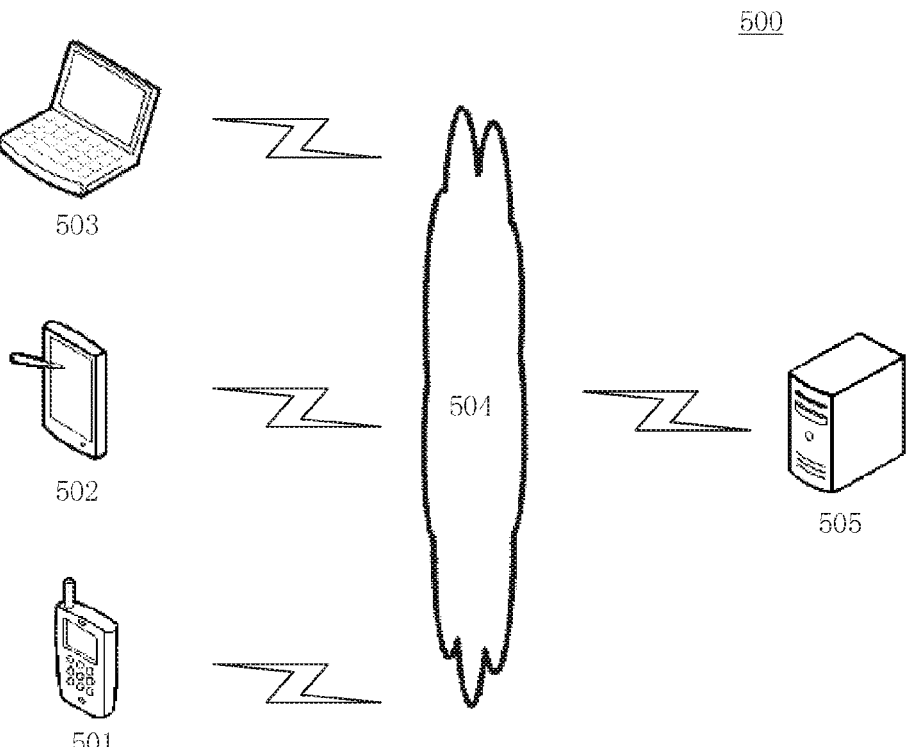
FIG. 5 is a diagram of an exemplary system architecture to which embodiments of the present disclosure may be applied.

FIG. 5 illustrates an exemplary system architecture 500 to which the method for classifying the blockchain address or the apparatus for classifying the blockchain address according to an embodiment of the present disclosure may be applied.

As shown in FIG. 5, the system architecture 500 may include terminal devices 501, 502 and 503, a network 504, and a server 505. The network 504 is used for providing a medium for a communication link between the terminal devices 501, 502 and 503 and the server 505. The network 504 may include various connection types, such as wired communication links, wireless communication links, and fiber optic cables.

Users may use the terminal devices 501, 502 and 503 to interact with the server 505 via the network 504, so as to receive or send messages, etc. Various communication client applications may be installed on the terminal devices 501, 502 and 503, such as shopping applications, web browser applications, search applications, instant messengers, email clients, and social platform software (only for illustration).

The terminal devices 501, 502 and 503 may be various electronic devices that have displays and support web browsing, including but not limited to smart phones, tablets, laptops and desktop computers, etc.

The server 505 may be a server that provides various services, such as a backend management server (only for illustration) that supports shopping websites viewed by users via the terminal devices 501, 502 and 503. The backend management server may perform analysis and other processing on received data such as a product information query request, and feed processing results, such as target push information and product information (only for illustration) to the terminal devices.

It is to be noted that the method for classifying the blockchain address according to the embodiment of the present disclosure is generally performed by the server 505, and accordingly, the apparatus for classifying the blockchain address is generally provided in the server 505.

It is to be understood that the numbers of the terminal devices, the network, and the server in FIG. 5 are merely schematic. Any number of terminal devices, networks, and servers may be provided as required by the implementation.

Figure 6:
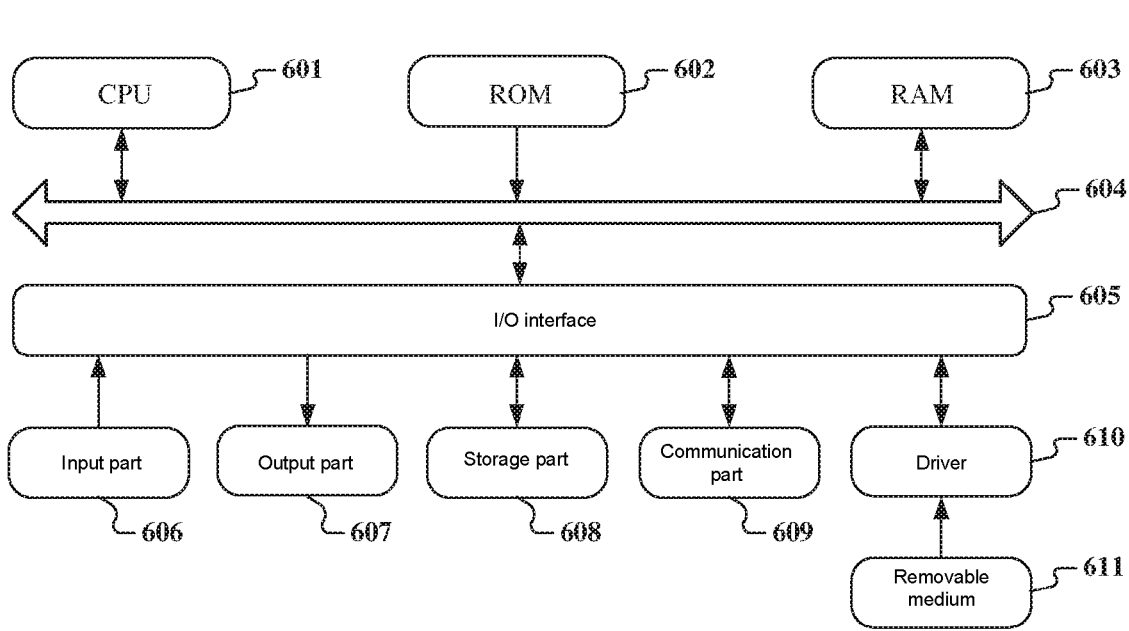
FIG. 6 is a schematic structural diagram of a computer system suitable for implementing a server according to some embodiments of the present disclosure.

Reference is made below to FIG. 6, which illustrates a schematic structural diagram of a computer system 600 suitable for implementing the server according to the embodiment of the present application. The server shown in FIG. 6 is only one example and should not impose any limitation on the function and scope of usage of the embodiments of the present application.

As shown in FIG. 6, the computer system 600 includes a central processing unit (CPU) 601 that may perform various appropriate actions and processing based on programs stored in a read-only memory (ROM) 602 or programs loaded from a storage unit 608 into a random access memory (RAM) 603. Programs and data required for operations of the computer system 600 may be further stored in the RAM 603. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, etc.; an output part 607 including a cathode ray tube (CRT), a liquid crystal display (LCD) and a speaker, etc.; a storage part 608 including a hard disk, etc.; and a communication part 609 including network interface cards such as an LAN card and a modem. The communication part 609 performs communication processing via a network such as the Internet. A driver 610 is also connected to the I/O interface 605 as needed. A removable medium 611, such as a disk, a compact disk, a magnetic disk and a semiconductor memory, is installed on the driver 610 as needed such that computer programs read therefrom are installed into the storage part 608 as needed.

In particular, according to the embodiments of the present disclosure, the process described above with reference to the flow diagrams may be implemented as computer software programs. For example, an embodiment of the present disclosure includes a computer program product which includes a computer program carried on a non-transitory computer-readable medium. The non-transitory computer program includes a program code for performing the method shown in the flow diagram. According to this embodiment, the computer program may be downloaded and installed from the network via the communication part 609, and/or installed from the removable medium 611. The computer program, when executed by the central processing unit (CPU) 601, performs the above functions as defined in the system according to the present application.

It is to be noted that the non-transitory computer-readable medium according to the present disclosure may be a computer-readable signal medium or a computer-readable storage medium or any combination of both of the above. The computer-readable storage medium may be, for example, but is not limited to, an electrical, magnetic, optical, electromagnetic, infrared, or semiconductor system, apparatus, or device, or any combination of the above. More specific examples of the computer-readable storage medium may include, but are not limited to: electrical connection via one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination of the above. According to the present application, the computer-readable storage medium may be any tangible medium that includes or stores a program, and the program may be used by or in combination with an instruction execution system, apparatus, or device. According to the present application, the computer-readable signal medium may include data signals propagated in a baseband or as part of a carrier wave, in which computer-readable program codes are carried. Such propagated data signals may be in a variety of forms, including but not limited to electromagnetic signals, optical signals, or any suitable combination of the above. The computer-readable signal medium may also be any computer-readable medium other than the computer-readable storage medium, and the computer-readable medium may send, propagate, or transmit a program for use by or in conjunction with the instruction execution system, apparatus, or device. The program codes included by the computer-readable medium may be transmitted via any suitable medium, including but not limited to: wireless, wired, fiber optic cables, RF, etc., or any suitable combination of the above.

The flow diagrams and the block diagrams in the accompanying drawings illustrate possible implementations of the architecture, functionality, and operation of the system, the method, and the computer program product according to the embodiments of the present application. In this regard, each block in the flow diagram or block diagram may represent a module, a program segment, or part of a code, the module, the program segment, or part of the code including one or more executable instructions for implementing specified logical functions. It is also to be noted that in some alternative implementations, the functions noted in the blocks may also occur out of the order noted in the accompanying drawings. For example, two blocks shown in succession may actually be executed in parallel substantially, and sometimes they may also be executed in an inverse order, which depends upon the functionality involved. It is also to be noted that each block in the block diagrams or flow diagrams as well as a combination of blocks in the block diagrams or flow diagrams may be implemented using a special hardware-based system that executes specified functions or operations, or implemented using a combination of special hardware and computer instructions.

The modules described as involved in the embodiments of the present disclosure may be implemented by means of software, or by means of hardware. The modules described may also be provided in a processor and may be described, for example, as a processor including a transaction vector generation module, an address vector generation module, and an address class determination module. The names of the modules do not, in some cases, constitute a limitation on the modules. For example, the transaction vector generation module may also be described as a module configured to extract transaction records corresponding to each blockchain address in a blockchain address set and generate a corresponding transaction vector for each transaction record.

As another aspect, the present disclosure further provides a non-transitory computer-readable medium, which may be included in the device described in the above embodiments, or be present separately and not fitted into the device. The above non-transitory computer-readable medium carries one or more programs that, when executed by the device, cause the device to include: extracting transaction records corresponding to each blockchain address in a blockchain address set, and generating a corresponding transaction vector for each transaction record, the blockchain address set including a blockchain address to be classified; generating, based on transaction vectors corresponding to the blockchain address to be classified, an address vector corresponding to the blockchain address to be classified; and inputting the address vector of the blockchain address to be classified into a classifier to obtain a class of the blockchain address to be classified.

According to the technical solutions of the embodiments of the present disclosure, the corresponding transaction vectors are generated for the transaction records corresponding to each blockchain address in the blockchain address set; an address vector corresponding to a blockchain address to be classified is generated based on transaction vectors corresponding to the blockchain address to be classified; and the address vector of the blockchain address to be classified is input into the classifier, so as to determine the class of the blockchain address to be classified. Equal-length vectors representing the blockchain addresses can be obtained for classification by the classifier, the transaction behaviors and the association relationships of the participating entities in the blockchain are effectively expressed. At the same time, the problem that feature engineering in traditional machine learning is prone to being affected by the external environment, such as participants, transaction modes and an exchange rate between blockchain tokens and legal tender is also avoided. The classification accuracy is high, and a result is reliable; and the defects of error propagation, insufficient algorithm generalization, high requirements for hardware resources and time costs, etc. in existing methods are also overcome.

The specific implementations above are not to be construed as limiting the scope of protection of the present disclosure. It will be apparent to a person skilled in the art that various modifications, combinations, sub-combinations, and substitutions may occur, depending upon design requirements and other factors. Any modification, equivalent replacement, improvement, etc. made within the spirit and principle of the present disclosure should be included in the scope of protection of the present disclosure.

What is claimed is:

1. A method for classifying a blockchain address, comprising:

extracting transaction records corresponding to each blockchain address in a blockchain address set, and generating a corresponding transaction vector for each transaction record of the transaction records, the blockchain address set comprising a blockchain address to be classified;

generating, based on transaction vectors corresponding to the blockchain address to be classified, an address vector corresponding to the blockchain address to be classified; and inputting the address vector of the blockchain address to be classified into a classifier to obtain a class of the blockchain address to be classified;

wherein extracting transaction records corresponding to each blockchain address in the blockchain address set, and generating the corresponding transaction vector for each transaction record of the transaction records comprises:

extracting the transaction records corresponding to each blockchain address in the blockchain address set, and numbering the extracted transaction records sequentially based on transaction generation time, each transaction record having a unique transaction number;

treating a set as one corpus, wherein the set is a set of the transaction records corresponding to each blockchain address in the blockchain address set;

sequencing transaction numbers based on frequency of occurrence of the transaction numbers in all corpora to obtain a transaction number word list; and vectorizing the transaction numbers in the transaction number word list to obtain the transaction vector of a corresponding transaction record, wherein the transaction vector is a word vector of a corresponding transaction number.

2. The method as claimed in claim 1, wherein vectorizing the transaction numbers in the transaction number word list to obtain the transaction vector of the corresponding transaction record comprises:

encoding the transaction numbers in the transaction number word list to obtain a sparse matrix comprising transaction number encoded vectors, a component of 1 in the transaction number encoded vectors indicating a position of a corresponding transaction number in the transaction number word list; and generating, by means of a preset word vector generation algorithm, the transaction vector of the corresponding transaction record based on the sparse matrix.

3. The method as claimed in claim 2, wherein the blockchain address set further comprises blockchain addresses with tags, the tags indicating corresponding classes of the blockchain addresses; and generating, by means of the preset word vector generation algorithm, the transaction vector of the corresponding transaction record based on the sparse matrix comprises:

inputting the sparse matrix into a Continuous Bag of Words (CBOW) model of the preset word vector generation algorithm for training to output a word vector as the transaction vector of the corresponding transaction record.

4. The method as claimed in claim 1, wherein generating, based on the transaction vectors corresponding to the blockchain address to be classified, the address vector corresponding to the blockchain address to be classified comprises:

calculating an average value of all transaction vectors corresponding to the blockchain address to be classified to obtain the address vector corresponding to the blockchain address to be classified.

5. The method as claimed in claim 1, wherein the blockchain address set further comprises blockchain addresses with tags, the tags indicating corresponding classes of the blockchain addresses; and the method further comprises:

generating, based on transaction vectors corresponding to the blockchain addresses with the tags, address vectors corresponding to the blockchain addresses with the tags respectively; and training the classifier with the address vectors of the blockchain addresses with the tags.

6. The method as claimed in claim 5, wherein training the classifier with the address vectors of the blockchain addresses with the tags comprises:

constructing a training set with the address vectors of the blockchain addresses with the tags, and inputting the address vectors in the training set into an extreme Gradient Boosting algorithm model for training, so as to obtain the classifier.

7. An electronic device, comprising:

one or more processors; and a memory, configured to store one or more programs, wherein the one or more programs, when executed by the one or more processors, cause the one or more processors to implement following actions:

extracting transaction records corresponding to each blockchain address in a blockchain address set, and generating a corresponding transaction vector for each transaction record of the transaction records, the blockchain address set comprising a blockchain address to be classified;

generating, based on transaction vectors corresponding to the blockchain address to be classified, an address vector corresponding to the blockchain address to be classified; and inputting the address vector of the blockchain address to be classified into a classifier to obtain a class of the blockchain address to be classified;

wherein extracting transaction records corresponding to each blockchain address in the blockchain address set, and generating the corresponding transaction vector for each transaction record of the transaction records comprises:

extracting the transaction records corresponding to each blockchain address in the blockchain address set, and numbering the extracted transaction records sequentially based on transaction generation time, each transaction record having a unique transaction number;

treating a set as one corpus, wherein the set is a set of the transaction records corresponding to each blockchain address in the blockchain address set;

sequencing transaction numbers based on frequency of occurrence of the transaction numbers in all corpora to obtain a transaction number word list; and vectorizing the transaction numbers in the transaction number word list to obtain the transaction vector of a corresponding transaction record, wherein the transaction vector is a word vector of a corresponding transaction number.

8. The electronic device as claimed in claim 7, wherein vectorizing the transaction numbers in the transaction number word list to obtain the transaction vector of the corresponding transaction record comprises:

encoding the transaction numbers in the transaction number word list to obtain a sparse matrix comprising transaction number encoded vectors, a component of 1 in the transaction number encoded vectors indicating a position of a corresponding transaction number in the transaction number word list; and generating, by means of a preset word vector generation algorithm, the transaction vector of the corresponding transaction record based on the sparse matrix.

9. The electronic device as claimed in claim 8, wherein the blockchain address set further comprises blockchain addresses with tags, the tags indicating corresponding classes of the blockchain addresses; and generating, by means of the preset word vector generation algorithm, the transaction vector of the corresponding transaction record based on the sparse matrix comprises:

inputting the sparse matrix into a Continuous Bag of Words (CBOW) model of the preset word vector generation algorithm for training, and outputting a word vector as the transaction vector of the corresponding transaction record.

10. The electronic device as claimed in claim 7, wherein generating, based on the transaction vectors corresponding to the blockchain address to be classified, the address vector corresponding to the blockchain address to be classified comprises:

calculating an average value of all transaction vectors corresponding to the blockchain address to be classified to obtain the address vector corresponding to the blockchain address to be classified.

11. The electronic device as claimed in claim 7, wherein the blockchain address set further comprises blockchain addresses with tags, the tags indicating corresponding classes of the blockchain addresses; and the method further comprises:

generating, based on transaction vectors corresponding to the blockchain addresses with the tags, address vectors corresponding to the blockchain addresses with the tags respectively; and training the classifier with the address vectors of the blockchain addresses with the tags.

12. The electronic device as claimed in claim 11, wherein training the classifier with the address vectors of the blockchain addresses with the tags comprises:

constructing a training set with the address vectors of the blockchain addresses with the tags, and inputting the address vectors in the training set into an extreme Gradient Boosting algorithm model for training, so as to obtain the classifier.

13. A non-transitory computer-readable medium having a computer program stored thereon, wherein the computer program, when executed by a processor, implements following actions:

extracting transaction records corresponding to each blockchain address in a blockchain address set, and generating a corresponding transaction vector for each transaction record of the transaction records, the blockchain address set comprising a blockchain address to be classified;

generating, based on transaction vectors corresponding to the blockchain address to be classified, an address vector corresponding to the blockchain address to be classified; and inputting the address vector of the blockchain address to be classified into a classifier to obtain a class of the blockchain address to be classified;

wherein extracting transaction records corresponding to each blockchain address in the blockchain address set, and generating the corresponding transaction vector for each transaction record of the transaction records comprises:

extracting the transaction records corresponding to each blockchain address in the blockchain address set, and numbering the extracted transaction records sequentially based on transaction generation time, each transaction record having a unique transaction number;

treating a set as one corpus, wherein the set is a set of the transaction records corresponding to each blockchain address in the blockchain address set;

sequencing transaction numbers based on frequency of occurrence of the transaction numbers in all corpora to obtain a transaction number word list; and vectorizing the transaction numbers in the transaction number word list to obtain the transaction vector of a corresponding transaction record, wherein the transaction vector is a word vector of a corresponding transaction number.

14. The non-transitory computer-readable medium as claimed in claim 13, wherein vectorizing the transaction numbers in the transaction number word list to obtain the transaction vector of the corresponding transaction record comprises:

encoding the transaction numbers in the transaction number word list to obtain a sparse matrix comprising transaction number encoded vectors, a component of 1 in the transaction number encoded vectors indicating a position of a corresponding transaction number in the transaction number word list; and generating, by means of a preset word vector generation algorithm, the transaction vector of the corresponding transaction record based on the sparse matrix.

15. The non-transitory computer-readable medium as claimed in claim 14, wherein the blockchain address set further comprises blockchain addresses with tags, the tags indicating corresponding classes of the blockchain addresses; and generating, by means of the preset word vector generation algorithm, the transaction vector of the corresponding transaction record based on the sparse matrix comprises:

inputting the sparse matrix into a Continuous Bag of Words (CBOW) model of the preset word vector generation algorithm for training, and outputting a word vector as the transaction vector of the corresponding transaction record.

16. The non-transitory computer-readable medium as claimed in claim 13, wherein generating, based on the transaction vectors corresponding to the blockchain address to be classified, the address vector corresponding to the blockchain address to be classified comprises:

calculating an average value of all transaction vectors corresponding to the blockchain address to be classified to obtain the address vector corresponding to the blockchain address to be classified.

17. The non-transitory computer-readable medium as claimed in claim 13, wherein the blockchain address set further comprises blockchain addresses with tags, the tags indicating corresponding classes of the blockchain addresses; and the method further comprises:

generating, based on transaction vectors corresponding to the blockchain addresses with the tags, address vectors corresponding to the blockchain addresses with the tags respectively; and training the classifier with the address vectors of the blockchain addresses with the tags.

* * * * *